(12) United States Patent
Goeringer et al.

(10) Patent No.: US 11,206,142 B2
(45) Date of Patent: Dec. 21, 2021

(54) SYSTEMS AND METHODS FOR AUTOMATED CERTIFICATE RENEWAL MANAGEMENT

(71) Applicant: CABLE TELEVISION LABORATORIES, INC, Louisville, CO (US)

(72) Inventors: Steven J. Goeringer, Westminster, CO (US); Brian A. Scriber, Lafayette, CO (US); Darshak Thakore, Broomfield, CO (US); Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 90 days.

(21) Appl. No.: 16/544,895

(22) Filed: Aug. 19, 2019

(65) Prior Publication Data

US 2020/0059372 A1 Feb. 20, 2020

Related U.S. Application Data

(60) Provisional application No. 62/719,232, filed on Aug. 17, 2018.

(51) Int. Cl.
*H04L 9/32* (2006.01)
*H04L 9/00* (2006.01)

(52) U.S. Cl.
CPC ............ *H04L 9/3268* (2013.01); *H04L 9/007* (2013.01); *H04L 9/3265* (2013.01)

(58) Field of Classification Search
CPC ..... H04L 9/3268; H04L 9/007; H04L 9/3265; H04L 9/3247
See application file for complete search history.

(56) References Cited

U.S. PATENT DOCUMENTS

| | | | | |
|---|---|---|---|---|
| 7,484,089 B1* | 1/2009 | Kogen | ................. | H04L 63/062 713/156 |
| 9,432,356 B1* | 8/2016 | Johansson | ........... | H04L 63/0876 |
| 2009/0327708 A1* | 12/2009 | Hazlewood | ......... | H04L 63/0823 713/158 |
| 2010/0275012 A1* | 10/2010 | Kido | ..................... | H04L 9/3263 713/156 |
| 2011/0213966 A1* | 9/2011 | Fu | .......................... | H04L 9/3268 713/158 |
| 2013/0311771 A1* | 11/2013 | Hoggan | ................ | H04L 9/3268 713/156 |

(Continued)

*Primary Examiner* — Matthew Smithers
(74) *Attorney, Agent, or Firm* — Armstrong Teasdale LLP

(57) ABSTRACT

A method is provided for automating management of automatic renewal of a public key infrastructure (PKI) certificate issued by a certificate authority (CA) for a subscriber. The method includes steps of causing the subscriber to (i) transmit a first alert to a management entity for initiating renewal of the PKI certificate, and (ii) transmit a certificate signing request (CSR) to a registration authority (RA) for issuance of a renewal certificate. The method further includes steps of (iii) transmitting, from the RA to the CA, the CSR signed by the RA, (iv) receiving, at the RA from the CA, an issued renewal certificate signed by the CA, (v) sending, from the RA to the subscriber, the issued renewal certificate signed by the CA, and (vi) causing the subscriber to transmit a second alert to a management entity indicating renewal of the PKI certificate.

17 Claims, 3 Drawing Sheets

(56) References Cited

U.S. PATENT DOCUMENTS

| | | | |
|---|---|---|---|
| 2015/0222604 A1* | 8/2015 | Ylonen | G06F 21/575 |
| | | | 713/171 |
| 2017/0005808 A1* | 1/2017 | Gunti | H04L 9/321 |
| 2017/0006022 A1* | 1/2017 | Gunti | H04L 63/108 |
| 2017/0033935 A1* | 2/2017 | Clark | H04L 9/3265 |
| 2017/0222981 A1* | 8/2017 | Srivastav | H04L 63/0428 |
| 2019/0324419 A1* | 10/2019 | Lutz | G05B 19/0425 |

\* cited by examiner

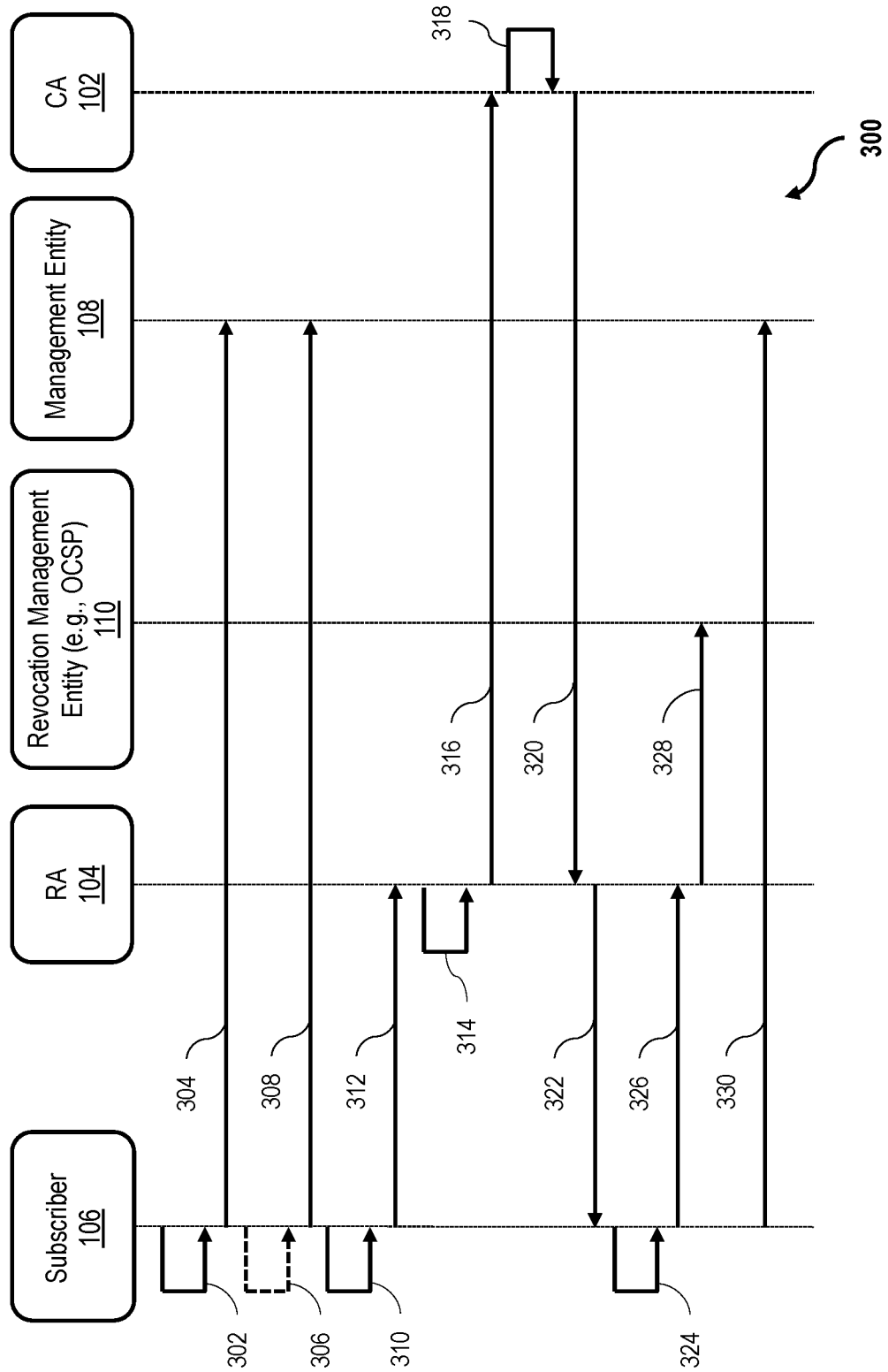

SYSTEMS AND METHODS FOR AUTOMATED CERTIFICATE RENEWAL MANAGEMENT

CROSS REFERENCE TO RELATED APPLICATIONS

This application claims the benefit of and priority to U.S. Provisional Patent Application No. 62/719,232, filed Aug. 17, 2018, the disclosure of which is incorporated by reference in its entirety.

BACKGROUND

The field of the disclosure relates generally to management of security certificates, and more particularly, to management of automated certificate renewal in a public key infrastructure (PKI) ecosystem.

Many conventional electronic devices, computer networks, computer programs, and other entities (referred to individually and collectively herein as "subscribers") utilize PKI to validate an electronic signature of the subscriber in a variety of technology fields, such as telecommunications (e.g., mobile communication devices), the Internet of Things (IoT), online banking, secure email, and e-commerce. PKI uses a pair of cryptographic keys (e.g., one public and one private) to encrypt and decrypt data, such that subscriber devices and modules may obtain and renew, for example, X.509 Certificates, which are used to establish trust between devices and encrypt communications using such protocols as Transport Layer Security (TLS), etc.

A PKI ecosystem includes policies and procedures for encrypting public keys, as well as the creation, management, distribution, usage, storage, and revocation of digital certificates. The PKI binds the public keys to the identity of a person or legal entity associated with the subscriber, typically through a trusted Certificate Authority (CA). The PKI hierarchy identifies a chain of trust for a device or program, and further may provide secure software download requirements for the devices/programs, and/or secure certificate injection requirements on the device manufacturers or program users. The CA, subscribers, electronic devices, device manufacturers, and other users interact over the PKI ecosystem.

Over time, the PKI digital Certificates may need to be renewed or revoked for a variety of reasons, such as, the encryption keys associated with the Certificate have been compromised or subject to time limitations, there are errors within an issued Certificate, there is a change in usage of the Certificate, or the Certificate owner is no longer deemed to be trusted. Some conventional renewal and revocation processes utilize a Certificate Revocation List (CRL) or an Online Certificate Status Protocol (OCSP). The CRL is a list of revoked Certificates (e.g., by serial number) that have been issued and then subsequently revoked by a given CA. CRLs are generally published on a periodic interval or can be published only when a Certificate is revoked by the CA.

The Online Certificate Status Protocol (OCSP) was originally introduced to overcome limitations relating to the use of CRLs. An OCSP may be implemented, for example, in the case where a subscriber computer device receives a Certificate, such as an X.509 Certificate, through a web browser, and is required to verify the information related to a revocation status of the Certificate. To proceed, the subscriber device looks up the server where the information relating to the revocation status may be found (e.g., by using one or more URLs embedded in the Certificate, or by using locally configured options). In some cases, the transport protocol, such as raw TCP, requires the submission of an OCSP request to determine the status of the Certificate. In these situations, the user computer device generates the OCSP request and transmits the query to an OCSP responder. The OCSP responder responds with an OCSP response that includes information about the revocation status of the Certificate.

Thus, conventional device access and network authentication processes often leverage manually integrated asymmetric key pairs and corresponding PKI Certificates issued (i.e., signed) through a centralized trust authority (e.g., the CA). When the Certificates expire, the Certificates are either: (i) revoked, and cannot be replaced, updated, or renewed; or (ii) renewed, but require manual integration of new asymmetric key pairs, and corresponding new Certificates, for further use.

Conventional certificate renewal schemes leverage online certificate renewal systems which themselves leverage automatic certificate issuance processes using protocols such as Simple Certificate Enrollment Protocol (SCEP) and Enrollment over Secure Transport (EST). Implementation of these conventional protocols, however, has introduced security weaknesses into the PKI ecosystems in which they are employed, through inadequate validation of the Certificates and/or PKI subscribers to the ecosystem. Both protocols, for example, transmit/receive messages to/from the CA, but require that the messages be signed with a pre-existing Certificate in order to enroll for a new Certificate with the CA. EST, in particular, outsources its TLS to a standard TLS, which adds an additional challenge for constrained devices lacking dedicate code-space for TLS implementation. Accordingly, there is a need for improved systems and methods for automatic certificate renewal.

SUMMARY

In an embodiment, a method is provided for automating management of automatic renewal of a public key infrastructure (PKI) certificate issued by a certificate authority (CA) for a subscriber. The method includes steps of causing the subscriber to (i) transmit a first alert to a management entity for initiating renewal of the PKI certificate, and (ii) transmit a certificate signing request (CSR) to a registration authority (RA) for issuance of a renewal certificate. The method further includes a step of transmitting, from the RA to the CA, the CSR signed by the RA. The method further includes a step of receiving, at the RA from the CA, an issued renewal certificate signed by the CA. The method further includes a step of sending, from the RA to the subscriber, the issued renewal certificate signed by the CA. The method further includes a step of causing the subscriber to transmit a second alert to a management entity indicating renewal of the PKI certificate.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

FIG. 3 is a sequence diagram illustrating an enhanced certificate renewal process, in accordance with an embodiment.

Figure 1:
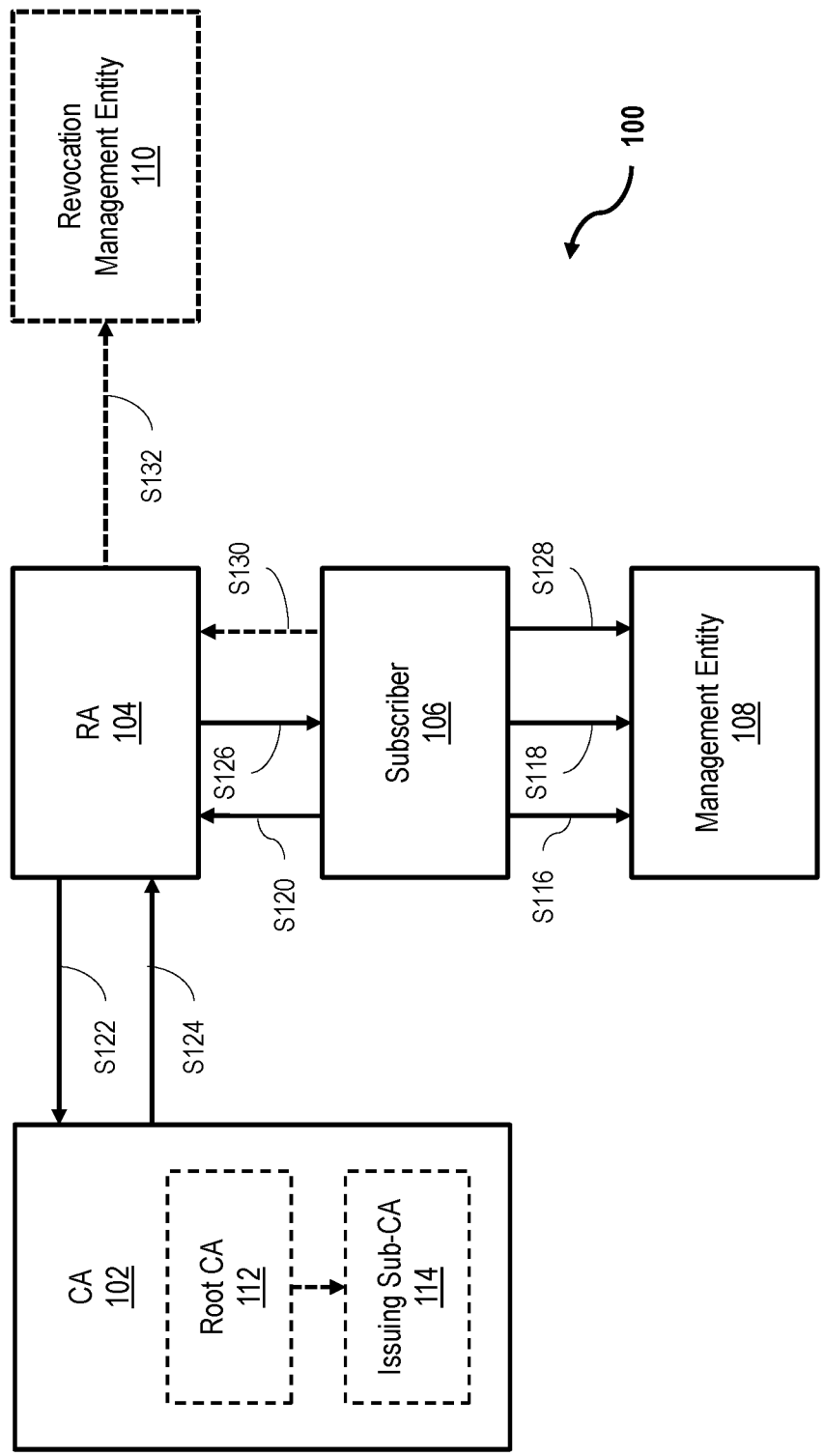
FIG. 1 is a schematic illustration of a certificate renewal system, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, "CA" refers to a Certificate Authority hosting a Root Certificate, and may further include, without limitation, one or more of a CA computer system, a CA server, a CA webpage, and a CA web service. The CA entity may include hardware and/or software to enable the entity to issue, manage, revoke, and renew PKI Certificates. As used herein, "Sub-CA" may refer to a subordinate CA issued directly from a Root CA (i.e., the CA hosting the Root Certificate), and which enables more specific policy implementations while protecting the Root CA from undesired exposure.

As used herein, "OCSP" refers to an Internet protocol used for obtaining the revocation status of an X.509 digital Certificate.

As used herein, "PKI" generally refers to a public key infrastructure including a set of policies, processes, server platforms, software, and/or workstations used for the purpose of administering certificates and public-private key pairs, and which may further include capabilities to issue, maintain, and/or revoke public key Certificates.

As used herein, "MA," refers to a management authority entity providing trust management services to support the ecosystem in meeting its security goals using the PKI.

As used herein, "Subscriber" is intended to refer to an entity requesting a Certificate (e.g., a manufacturer, cable operator, registering device, etc.), and which is authorized to use, and capable of using, the private key corresponding to the public key listed in a particular Certificate.

As used herein, "RA," refers to a registration authority entity for collecting and verifying each Subscriber's identity and the information that is to be entered into the public key Certificate. The RA may be responsible for accepting requests for digital Certificates and authenticating the entity making the request.

The embodiments described herein provide systems and methods for enhanced PKI management, as well as the automated management of automatic PKI certificate renewal. In an exemplary embodiment, the present systems and methods provide innovative and enhance techniques for automated Certificate renewal with revocation capability. The present automated management schemes represent significant improvements over conventional systems that, even where the a PKI Certificate may be automatically renewed, the management of such renewals still requires manual intervention.

The present embodiments are fully compatible with existing Certificate processes that leverage existing RFC 5280-compliant processes (i.e., according to Internet X.509 Public Key Infrastructure Certificate and CRL Profile), and further advantageously enable further augmentation by added certificate extensions (if desired). In an exemplary embodiment, methods for automatically managing the renewal of PKI Certificates include additional security mechanisms to limit unauthorized use of Certification through integrated revocation.

In an exemplary embodiment, the present systems and methods may utilize an X.509 trust model, in which a trusted central or third party CA is responsible for signing digital Certificates. Accordingly, as described herein, the CA is presumed to have capability to store one or more trusted Root Certificates (or intermediate Certificates) as well as the corresponding private keys. The CA is further responsible for maintaining up-to-date revocation information regarding the validity of issued Certificates, and will provide information to the other parties, for example, through CRL or the OCSP. OCSP messages may be communicated, for example, by Abstract Syntax Notation One (ASN.1) encoding over the Hypertext Transfer Protocol (HTTP), from and to OCSP responders of the CA server (or OCSP server).

FIG. 1 is a schematic illustration of a certificate renewal system 100. In an exemplary embodiment, system 100 represents a trust framework architecture for an exemplary PKI ecosystem, and is configured to manage and monitor trust throughout the ecosystem and implement access among the various parties thereto. System 100 is provided by way of example, for illustrative purposes, and is not intended to be limiting. Other PKI frameworks/architectures may implement the present techniques without departing from the scope of the present embodiments. Furthermore, for ease of explanation, some components that may be implemented within system 100 are not illustrated in FIG. 1, and system 100 may additionally include some generic hardware structure or software functionality, to facilitate operable communication among ecosystem components, but which also is not illustrated in FIG. 1.

In the exemplary embodiment depicted in FIG. 1, system 100 includes a CA 102, an RA 104, a Subscriber 106, and a Management Entity 108. In some embodiments, system 100 further includes a Revocation Management Entity 110. In some embodiments, CA 102 is a trusted central or third party single CA entity configured for hosting the Root Certificate. In other embodiments, CA 102 constitutes a Root CA 112 in communication with one or more issuing Sub-CAs 114. In such cases, Root CA 112 may represent the highest level of CA hierarchy and serve as the trust anchor.

Sub-CAs 114 may then exist below Root CA 112 and define and authorize types of Certificates that may be requested from Root CA 112. For example, separate Sub-CAs 114 may be disposed at different respective locations, or a first Sub-CA 114 may be dedicated for Certificates having ECC keys, whereas a second Sub-CA 114 may be for Certificates having RSA keys. In some embodiments, CA 102 may represent a hierarchy of Sub-CAs 114, with Root CA 112 at the virtual top of the hierarchy. In such a hierarchy, each Sub-CA 114 may be signed by a Sub-CA 114 above that Sub-CA 114 in the hierarchy to create the chain of trust.

In an embodiment, CA 102 is configured for authorization to issue, manage, revoke, and renew Certificates. CA 102 may be further configured for one or more of the following functions of system 100: (i) developing and maintaining certification practice statements (CPSs); (ii) issuing compliant Certificates; (iii) securing delivery of Certificates to Subscriber(s) 106; (iv) revoking Certificates; (v) generating, protecting, operating, and destroying CA private keys; (vi) managing all aspects of CA services, operations, and infrastructure related to issued Certificates; and (vii) acting as a trusted party to facilitate confirmation of the binding between a public key and the identity, and/or other attributes, of the "subject" of a Certificate.

In an embodiment, CA 102 (or an issuing Sub-CA 114) generates a signed digital Certificate that is installed on a requesting server, e.g., of RA 104 or Subscriber 106. For example, the signed Certificate may be associated with a website to generate a trust level for that website, and the requesting server may transmit a connection request to a receiving server using the Certificate. If the receiving server validates that Certificate or the signature of the Certificate, such as through a third party validation authority (VA, not shown in FIG. 1), then the receiving server approves the connection request.

In some embodiments of system 100, some or all of the respective parties thereof are in direct or indirect operable communication with an electronic communications network (e.g., Internet, LAN, WAN, WLAN, etc.). In at least one embodiment, one or more of the ecosystem parties may be in direct communication with CA 102, such as in the case where verification of the digital identities of the respective parties is performed by CA 102. In an exemplary embodiment, PKI-based Certificates are utilized to implement secure communication between an authentication of parties for each transaction, and the Certificates are issued according to the X.509 standard, which defines the most commonly used format for public key Certificates in use today.

In an exemplary embodiment, Subscriber 106 may include a processor and an electronic memory (not shown), and store at least one application or set of computer-executable instructions within the memory. When executed by the processor, the computer-executable instructions may cause Subscriber 106 to initiate one or more of the Subscriber-related steps of the several embodiments described herein. In some embodiments, these Subscriber-related steps may be executed automatically upon transmittal of one or more of the several alerts described herein, and may be further executed automatically, without the need for manual intervention.

In an embodiment, RA 104 is an entity responsible for collecting and verifying the identity of each Subscriber 106, along with any relevant information that is to be entered into the public key Certificate. As illustrated in the example depicted in FIG. 1, RA 104 interacts with CA 102 such that RA 104 may enter and approve the Certificate request information of Subscriber 106. In at least one embodiment, RA 104 may be, or act in the capacity of, a Sub-CA 114 of CA 102.

In an embodiment, Management Entity 108 is an entity responsible for Management Authority (MA) of system 100, and is configured to manage the design, development, and implementation of the PKI architecture on behalf of the PKI policy authority (PA). In some embodiments, Management Entity 108 serves to functionally provide trust management services to support the ecosystem in meeting its security goals using the PKI, and focuses on ensuring that policies for secure physical and logical access, data sharing, and communications across the ecosystem are realized through the execution and management of certificate policies and standards.

Management Entity 108 may be further configured to provide one or more processes for: (i) submitting a CPS; (ii) rules for the PA to approve the CPS; (iii) recognizing Subscribers 106, or the authorized representatives therof, as well as Subscriber agreements; (iv) revocation requests; (v)

audits; (vi) registration of Sub-CAs 114; and (vii) registration of Subscribers 106. In some embodiments, the PA is Management Entity 108. In other embodiments, Management Entity 108 is a trusted third party, designated by the PA to provide MA services on behalf of the PA, and to provide operational support for the ecosystem and maintain the PKI.

In an embodiment, issued Certificates are received by Relying Parties (not shown in FIG. 1), which are entities capable of receiving a Certificate having a digital signature that is verifiable with the public key listed in the Certificate. Such Relying Parties are considered, for purposes of this disclosure, to be in positions capable of assessing the trust in the authentication information provided by the Certificate. That is, a Relying Party may be an entity that validates the binding of a public key to the name of a Subscriber 106 in a PKI Certificate, and may use the Certificate to: (i) verify the integrity of a digitally signed message; (ii) identify the initiator of a communication; or (iii) establish confidential communications with the holder of the Certificate. In an exemplary embodiment, Subscriber 106 may include without limitation any device, component, network, system, or software module that uses a PKI Certificate (e.g., including authority certificates, such as of CA 102, RA 104, Management Entity 108, Sub-CA 114, etc.).

Exemplary operation of system 100 begins at step S116, where Subscriber 106 transmits a message containing a Certificate-expiration-alert to Management Entity 108. At step S118, Subscriber 106 sends a request message to Management Entity 108 for renewal of the Certificate. In an exemplary embodiment of step S118, the renewal request is sent in the same message from step S116 containing the expiration alert. At step S120, Subscriber 106 submits a Certificate Signing Request (CSR, e.g., a message conveying a request to have a Certificate issued) to RA 104 for approval thereby.

In the case where the CSR is approved, at step S122, RA 104 sends the approved CSR (i.e., signed by RA 104) to CA 102 for approval thereby. Upon approval by CA 102, at step S124, CA 102 sends back to RA 104 a CA-signed Certificate. At step S126, RA 104 sends the CA-signed Certificate to Subscriber 106. In an embodiment where revocation is not additionally performed, upon completion of step S126, Subscriber completes Certificate renewal by transmitting to Management Entity 108, in step S128, a message (or alert) indicating that the Certificate has been renewed. In an exemplary embodiment, one or more of the preceding operational steps may occur automatically.

However, in an embodiment where revocation is desired, Subscriber 106 will, prior to execution of step S128, transmit to RA 104, in step S130, a self-revocation of the expiring Certificate. In step S132, RA 104 notifies Revocation Management Entity of the Certificate revocation. In some embodiments, step S132 is executed prior to execution of step S128. In other embodiments, step S132 is executed after, or simultaneously with, step S128.

According to the innovative design of system 100, in the case of a PKI Subscriber already having a valid (but expiring) Certificate, system 100 is enabled to not only automatically renew the expiring Certificate, but also to issue the renewed Certificate issued online at nearly the same security level as used to protect keys for the expiring Certificate. In the exemplary embodiment, the renewal Certificate is issued prior to expiration of the expiring Certificate. That is, according to the unique system of alerts described herein, Certificate renewal is readily and efficiently achieved prior to Certificate expiration. In an exemplary embodiment, a system of alert-, event-, and/or alarm-messages provided awareness to Subscriber 106, Management Entity 108, and/or system 100 of the status of a Certificate such that system 100 is advantageously enabled to perform proactive management and monitoring of issued Certificates.

In some embodiments, the proactive management alerts may be further enhanced through leveraging of custom extensions, such as "use before", "use after", or other custom extensions that enable proactive management of the timing of Certificate renewals prior to expiration. According to this proactive management scheme, other profile information stored in the Certificates may be used instead of, or in addition to, these extensions. In other embodiments, system may be configured such that peers (e.g., VA, etc.) configured to authenticate Subscriber 106 may optionally notify management servers (e.g., Management Entity 108) of expiring Certificates.

In some instances, Certificate lifetimes extensions may be implemented to identify a longest period for which Subscriber 106 may be issued a renewed Certificate, which may be of particular value for device certifications, licensing, end-of-life design limits, or other device management functions.

Upon successful use of a new Certificate by Subscriber 106, Subscriber 106 may be further enabled to revoke the expiring Certificate (i.e., self-revocation) and perform key destruction. In an exemplary embodiment of this scenario, the private key is necessarily deleted, but deletion of the public key is optional. In an embodiment, the self-revocation sub-process may further delete the revoked Certificate to more securely ensure that the expiring Certificate cannot be misused prior to its expiration, that is, in the period after the new/renewal Certificate has been issued, but before the expiring Certificate has actually expired. In an exemplary embodiment, the revocation message from Subscriber 106 is signed by the expiring Certificate (i.e., prior to expiration).

In at least one embodiment, in the case where use, by Subscriber 106, of the new Certificate fails, system 100 may operate such that the new Certificate is automatically revoked. In an exemplary embodiment of this scenario, the revocation message for the new Certificate from Subscriber 106 is signed by the expiring Certificate, and not by the new Certificate, for which usage has failed.

Figure 2:
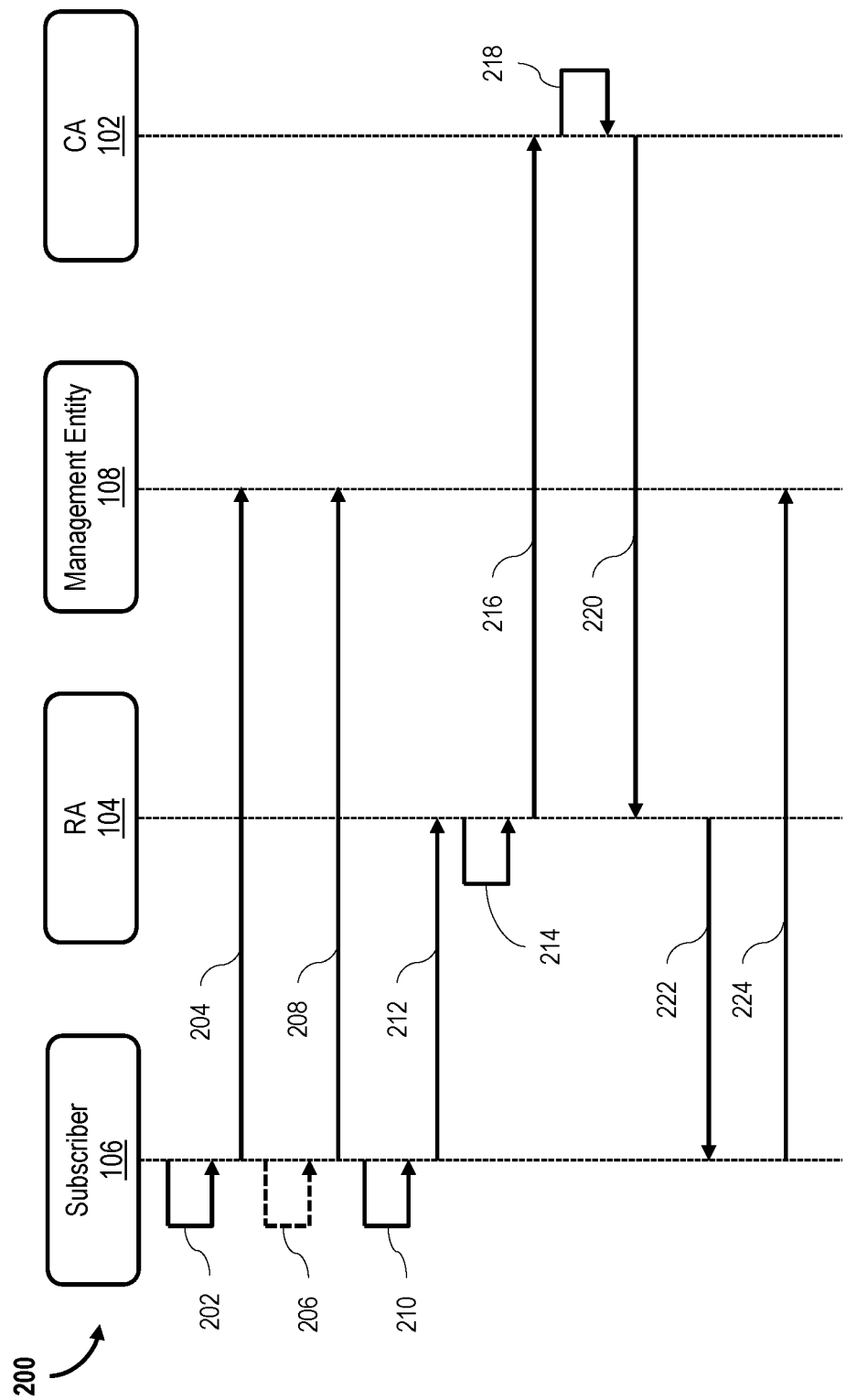
FIG. 2 is a sequence diagram illustrating an exemplary certificate renewal process, in accordance with an embodiment.

FIG. 2 is a sequence diagram illustrating an exemplary certificate renewal process 200. In an exemplary embodiment, process 200 illustrates steps relating to renewal of an expiring Certificate, which may be performed, for example, over system 100, FIG. 1, and through interaction of parties thereto, including at least Subscriber 106, RA 104, Management Entity 108, and CA 102. When implemented, process 200 may execute the following steps, which are not necessarily required to be in the order listed, except where so clearly designated as being dependent on a prior step. That is, unless otherwise described herein to the contrary, process 200 may execute one or more of the following steps in any particular order, sequentially or in parallel, and/or substantially simultaneously.

In an exemplary embodiment, process 200 begins at step 202, in which at least one Certificate of Subscriber 106 reaches a pre-certificate-expiration threshold (e.g., an expiration date, a "use before" custom extension, etc.). In step 204, Subscriber 106 sends a Certificate-expiration-alert to Management Entity 108. In an exemplary embodiment of step 204, the Certificate-expiration-alert is a message containing an alert, alarm, or event timing message used for proactive monitoring of the status of the expiring Certificate. Step 206 is optional. In step 206, Subscriber 106 gathers additional information (if any), and/or performs any additional analysis or verification, required by Management Entity 108.

In step 208, Subscriber 106 requests a renewal from Management Entity 108 of the expiring Certificate. In some embodiments of step 208, the renewal request is contained in the same message containing the Certificate-expiration-alert from step 204. In at least one embodiment of step 208, the renewal request contains a message from Subscriber 106 requesting that Management Entity 108 begins a renewal subprocess, or may include a renewal-process-begin-alert.

In step 210, Subscriber 106 generates new keys, and creates a CSR, for the Certificate renewal. In an exemplary embodiment of step 210, Subscriber 106 creates the new Certificate, or a draft thereof. In step 212, Subscriber 106 submits the CSR to RA 104 for approval. In step 214, RA 104 evaluates the CSR submission from Subscriber 106, renders a decision on the CSR, and upon an approval decision thereby, signs the CSR. In step 216, RA 104 transmits the approved (i.e., signed by RA 104) CSR to CA 102. In step 218, CA 102 evaluates the RA-approved CSR from RA 104, renders a decision on the CSR, and upon an approval decision thereby, signs a new/renewal Certificate. In step 220, CA 102 transmits the CA-signed Certificate to RA 104, and in step 222, RA 104 sends the CA-signed Certificate to Subscriber 106.

In step 224, Subscriber 106 notifies Management Entity 108 of the new Certificate. In an exemplary embodiment of step 224, the notification from Subscriber 106 includes a Certificate-renewed-alert. In some cases though, this system of proactive renewal alerts may leave a period of time, between issuance of the new/renewal Certificate and actual expiration of the expiring Certificate, in which the expiring Certificate should not be used, but a party may nevertheless attempt to do so. In such cases, the automated management techniques herein may further include automatic revocation capabilities for Subscriber 106.

FIG. 3 is a sequence diagram illustrating an enhanced certificate renewal process 300. In an exemplary embodiment, process 300 is similar to process 200, FIG. 2, and may also be performed with respect system 100, FIG. 1, and through interaction of Subscriber 106, RA 104, Management Entity 108, and CA 102. In contrast to process 200, process 300 may further include the interactive participation of one or more ecosystem parties with Revocation Management Entity 110. In an exemplary embodiment Revocation Management Entity is an OCSP of the PKI. Process 300 may otherwise operate similarly to process 200.

In an exemplary embodiment, process 300 begins at step 302, in which at least one Certificate of Subscriber 106 reaches a pre-certificate-expiration threshold (e.g., an expiration date, a "use before" custom extension, etc.). In step 304, Subscriber 106 sends a Certificate-expiration-alert to Management Entity 108. In an exemplary embodiment of step 304, the Certificate-expiration-alert is a message containing an alert, alarm, or event timing message used for proactive monitoring of the status of the expiring Certificate. Step 306 is optional. In step 306, Subscriber 106 gathers additional information (if any), and/or performs any additional analysis or verification, required by Management Entity 108.

In step 308, Subscriber 106 requests a renewal from Management Entity 108 of the expiring Certificate. In some embodiments of step 308, the renewal request is contained in the same message containing the Certificate-expiration-alert from step 304. In at least one embodiment of step 308, the renewal request contains a message from Subscriber 106 requesting that Management Entity 108 begins a renewal subprocess, or may include a renewal-process-begin-alert.

In step 310, Subscriber 106 generates new keys, and creates a CSR, for the Certificate renewal. In an exemplary embodiment of step 310, Subscriber 106 creates the new Certificate, or a draft thereof. In step 312, Subscriber 106 submits the CSR to RA 104 for approval. In step 314, RA 104 evaluates the CSR submission from Subscriber 106, renders a decision on the CSR, and upon an approval decision thereby, signs the CSR. In step 316, RA 104 transmits the approved (i.e., signed by RA 104) CSR to CA 102. In step 318, CA 102 evaluates the RA-approved CSR from RA 104, renders a decision on the CSR, and upon an approval decision thereby, signs a new/renewal Certificate. In step 320, CA 102 transmits the CA-signed Certificate to RA 104, and in step 322, RA 104 sends the CA-signed Certificate to Subscriber 106.

In step 324, Subscriber 106 attempts to use the new Certificate and the keys associated therewith. In step 326, if use of the new Certificate was successful in step 324, self-revocation of the old, expiring Certificate is implemented. For example, process 300 may automate the management of the revocation subprocess such that Subscriber 106 is enabled to revoke the expiring Certificate, to further prevent the expiring Certificate from being misused prior to its expiration (i.e., in the period after the new/renewal Certificate has been issued, but before the expiring Certificate has actually expired), and perform key destruction of one or more keys. In some embodiments of this scenario of step 324, Subscriber 106 performs key destruction by deleting both the private key and the public key of the old, expiring Certificate. In other embodiments of this scenario of step 324, Subscriber 106 deletes only the private key. In at least one embodiment of this scenario of step 324, Subscriber 106 deletes the old, expiring Certificate.

If, however, in step 324, use of the new Certificate was not successful, in step 326, revocation of the new, unsuccessful Certificate is alternatively implemented. For example, in this alternative scenario, Subscriber 106 is instead enabled to revoke the new Certificate. In an embodiment of this scenario of step 324, Subscriber 106 implements revocation by deleting the new Certificate, and may also delete one or both of the private key and the public key associated with the revoked new Certificate.

In step 328, RA 104 notifies Revocation Management Entity 110 of the Certificate revocation performed in step 326, that is, revocation of the old Certificate in the case of successful use of the new Certificate, or else revocation of the new Certificate. In this manner, Revocation Management Entity 110 (e.g., the OCSP) may be notified of revoked Certificates in real-time, thus providing yet another level of security against misuse of expiring Certificate after renewal but prior to actual expiration. In step 330, Subscriber 106 notifies Management Entity 108 of the Certificate renewal, if successfully used, and of the Certificate revocation, whether old or new. In an exemplary embodiment of step 330, the notification from Subscriber 106 includes submission of a Certificate-renewed-and-revocation alert. In both revocation scenarios, the Certificate-renewed-alert-and-revocation alert of step 330 is signed (e.g., using the private key) by the expiring Certificate (i.e., prior to the revocation thereof).

According to the innovative systems and methods described herein, automatic certificate renewal may be implemented under significantly advanced security considerations. In exemplary embodiments of these advanced security schemes, Subscribers (e.g., Subscriber 106) is enabled to support at least two key pairs and Certificates simultaneously, namely, (i) the Certificate and key pair of the expiring Certificate, and (ii) the Certificate and key pair of the new Certificate. For example, irrespective of which Certificate is revoked (i.e., old or new), both Certificates and key pairs will coexist with the Subscriber until one of the Certificates is revoked (e.g., according to process 300).

In the exemplary embodiment, upon receipt of the CA-signed Certificate, for example, through RA 104, Subscribers 106 may be further configured or automatically instructed to reinitiate all security associations (e.g., network access, secure transport, etc.). After all relevant security associations have been successfully re-established and authenticated, Subscribers 106 may then submit the revocation notice of the expiring Certificate (e.g., step 330, FIG. 3), where the notice is signed using the private key of the expiring Certificate, and then destroy the expiring Certificate key pair and delete the corresponding old Certificate.

Alternatively, in the case where all of the relevant Certificate associations are not successfully authenticated and established, Subscriber 106 may instead revert back to the expiring Certificate and associated keys. In some instances of this alternative, appropriate fail conditions and remediation may be further specified without departing from the scope herein. For example, it may be desirable that such fail conditions account for the possibility that renewal of the expiring Certificate may be validly attempted again, whether according to these automated management techniques or by manual intervention by an operator. In this scenario, the newly issued keys should first be destroyed, and the new Certificate revoked (i.e., signed by the key of the expiring Certificate), before the renewal process is re-initiated. In this manner, RA 104 (which may have already authorized payment for the renewal Certificate), may not be required to allow the request for another Certificate renewal until RA 104 is able to verify that the previous, but failed, renewal Certificate has been, in fact, revoked.

Accordingly, the embodiments described herein improve upon existing technologies, and also improve the functionality of computers, by automating the management of processes for automatically renewing digital Certificates. The present embodiments thus improve the speed, efficiency, and accuracy in which automatic processes may be performed. In light of these improvements, the present embodiments provide computer-related solutions for more efficiently automating conventional techniques requiring manual input, and further address computer-related issues regarding, for example, digital security.

Accordingly, the innovative systems and methods described herein are of particular value within the realm of secure Internet communications. The present embodiments enable more reliable updating and monitoring of such communications, but without compromising data and speed. Furthermore, according to the disclosed techniques, user computer device are better able to monitor and determine the security of websites and other connected devices, and thereby protecting computer devices from malicious actors.

Exemplary embodiments of systems and methods for automating management of automatic renewals and revocations of digital Certificates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for automating management of automatic renewal of a public key infrastructure (PKI) certificate issued by a certificate authority (CA) for a subscriber, the method including the steps of:
    causing the subscriber to transmit a first alert to a management entity for initiating renewal of the PKI certificate;
    causing the subscriber to transmit a certificate signing request (CSR) to a registration authority (RA) for issuance of a renewal certificate;
    transmitting, from the RA to the CA, the CSR signed by the RA;
    receiving, at the RA from the CA, an issued renewal certificate signed by the CA;
    sending, from the RA to the subscriber, the issued renewal certificate signed by the CA; and
    causing the subscriber to transmit a second alert to a management entity indicating renewal of the PKI certificate,
    wherein the step of causing the subscriber to transmit the first alert comprises a first sub-step of transmitting a certificate expiration alert and a second sub-step of transmitting a renewal initiation alert,
    wherein the certificate expiration alert comprises at least one notification message regarding the status and an expiration date of the PKI certificate, and
    wherein the PKI certificate includes profile information have at least one extension indicating a renewal timing of the PKI certificate.

2. The method of claim 1, wherein the first sub-step and the second sub-step are performed simultaneously.

3. The method of claim 1, wherein the first sub-step is performed prior to the second sub-step.

4. The method of claim 1, wherein the certificate expiration alert is received by the management entity from a peer of the subscriber.

5. The method of claim 1, wherein the step of causing the subscriber to transmit the first alert is performed automatically upon meeting the renewal timing of the at least one extension.

6. The method of claim 1, wherein the at least one extension comprises a certificate lifetime extension.

7. A method for automating management of automatic renewal of a public key infrastructure (PKI) certificate issued by a certificate authority (CA) for a subscriber, the method including the steps of:
causing the subscriber to transmit a first alert to a management entity for initiating renewal of the PKI certificate;
causing the subscriber to transmit a certificate signing request (CSR) to a registration authority (RA) for issuance of a renewal certificate;
transmitting, from the RA to the CA, the CSR signed by the RA;
receiving, at the RA from the CA, an issued renewal certificate signed by the CA;
sending, from the RA to the subscriber, the issued renewal certificate signed by the CA; and
causing the subscriber to transmit a second alert to a management entity indicating renewal of the PKI certificate,
wherein the step of causing the subscriber to transmit the second alert is performed prior to expiration of the PKI certificate.

8. The method of claim 7, wherein the CSR includes at least one new key pair generated by the subscriber for the renewal certificate.

9. The method of claim 8, wherein the CSR further includes at a draft of the renewal certificate.

10. The method of claim 9, further comprising, prior to the step of causing the subscriber to transmit the second alert, a step of causing the subscriber to use the issued renewal certificate and the new key pair.

11. The method of claim 10, wherein the step of causing the subscriber to transmit the second alert further comprises a certificate revocation alert signed with a private key of an original key pair associated with the PKI certificate.

12. The method of claim 11, further comprising a step of revoking one of the PKI certificate and the issued renewal certificate.

13. The method of claim 11, wherein the step of revoking comprises a revocation of the PKI certificate upon successful completion of the step of causing the subscriber to use the issued renewal certificate and the new key pair.

14. The method of claim 13, wherein the step of revoking further comprises a sub-step of deleting the PKI certificate and a private key of an original key pair associated with the PKI certificate.

15. The method of claim 14, wherein the step of revoking further comprises deletion of a public key of the original key pair associated with the PKI certificate.

16. The method of claim 11, wherein the step of revoking comprises a revocation of the issued renewal certificate upon a failure to successfully complete the step of causing the subscriber to use the issued renewal certificate and the new key pair.

17. The method of claim 16, wherein the step of revoking further comprises a sub-step of deleting the issued renewal certificate.

* * * * *